United States Patent
Torkestani et al.

(10) Patent No.: US 10,454,286 B2
(45) Date of Patent: Oct. 22, 2019

(54) CONVERSION CIRCUIT DEVICE FOR UNINTERRUPTIBLE POWER SUPPLY (UPS) SYSTEMS

(71) Applicant: Blue Solutions Canada Inc., Boucherville (CA)

(72) Inventors: Sina Torkestani, Brossard (CA); David Morin, Sainte-Therese (CA); Jean Caron, St-Eugene-de-Grantham (CA); Khaled Taibi, Montreal (CA); Stephane Carignan, Longueuil (CA); Alain Vallee, Varennes (CA)

(73) Assignee: BLUE SOLUTIONS CANADA INC., Boucherville (CA)

(*) Notice: Subject to any disclaimer, the term of this patent is extended or adjusted under 35 U.S.C. 154(b) by 69 days.

(21) Appl. No.: 15/817,195

(22) Filed: Nov. 18, 2017

(65) Prior Publication Data

US 2018/0145522 A1 May 24, 2018

Related U.S. Application Data

(60) Provisional application No. 62/426,311, filed on Nov. 24, 2016.

(51) Int. Cl.
*H02J 7/00* (2006.01)
*H01M 10/06* (2006.01)
*H01M 10/46* (2006.01)
*H01M 10/48* (2006.01)
*H02J 9/06* (2006.01)

(52) U.S. Cl.
CPC ........... *H02J 7/0024* (2013.01); *H01M 10/06* (2013.01); *H01M 10/46* (2013.01); *H01M 10/486* (2013.01); *H02J 7/007* (2013.01); *H02J 7/0011* (2013.01); *H02J 7/0068* (2013.01); *H02J 9/06* (2013.01); *Y02E 60/122* (2013.01); *Y02E 60/126* (2013.01)

(58) Field of Classification Search
CPC ...... H02J 7/0024; H02J 7/0011; H02J 7/0068; H02J 7/007; H02J 9/06; H01M 10/06; H01M 10/46; H01M 10/486; Y02E 60/122; Y02E 60/126
See application file for complete search history.

(56) References Cited

U.S. PATENT DOCUMENTS

| | | | | |
|---|---|---|---|---|
| 2013/0051104 A1* | 2/2013 | Nakano | ............... | H02J 7/0006 363/131 |
| 2014/0184159 A1* | 7/2014 | Kachi | ............... | B60L 1/003 320/109 |
| 2015/0318717 A1* | 11/2015 | Yamauchi | ............ | H01M 10/44 320/162 |

(Continued)

*Primary Examiner* — Jared Fureman
*Assistant Examiner* — Michael J Warmflash
(74) *Attorney, Agent, or Firm* — BCF LLP (57) ABSTRACT

A conversion circuit device for connecting lithium based batteries to a standard inverter/charger for lead-acid batteries and an Uninterruptible Power Supply (UPS) system for homes and facilities comprising a standard inverter/charger for lead-acid batteries, at least one lithium based battery, and a conversion circuit device connecting the at least one lithium based battery to the standard inverter/charger; the conversion circuit device translating the state of the at least one lithium based battery into signals that correspond to the state of a lead-acid battery.

12 Claims, 5 Drawing Sheets

(56) References Cited

U.S. PATENT DOCUMENTS

2017/0301951 A1* 10/2017 Carignan .......... H01M 10/0565
2017/0317649 A1* 11/2017 Lee ........................ B60L 58/20
2018/0166677 A1*  6/2018 Mortreux .............. H01M 2/348

* cited by examiner

CONVERSION CIRCUIT DEVICE FOR UNINTERRUPTIBLE POWER SUPPLY (UPS) SYSTEMS

FIELD OF THE INVENTION

The present invention relates to a circuit device for linking a lithium based battery or battery pack to a standard inverter/charger for lead-acid batteries.

BACKGROUND OF THE INVENTION

Uninterruptible power supply (UPS) systems for homes and facilities have been deployed for many years and typically consist of a 48 Vdc lead-acid battery pack connected to an Inverter/charger which is connected to the power grid and to the home or facility. The Inverter/charger is adapted to monitor the state of charge of the battery pack and to recharge the battery pack when required preferably when power consumption is low and/or when the energy companies charge less for electricity such as overnight. The Inverter/charger also provides the functions of: a) transferring the AC power from the grid directly to the home or facility when power consumption is normal; b) injecting power from the battery pack to the home or facility when power consumption exceeds the capacity of the power grid or for peak shaving to ensure that power consumption of the home or facility does not exceed a threshold where the electricity becomes more expensive; and c) supplying back-up power to the home or facility exclusively from the battery pack during the power grid outages.

The Inverter/charger charges the lead-acid battery pack by taking the input AC power from the grid, converting it to a DC power and directing the DC current to the battery pack. Conversely, the Inverter/charger supplies power from the lead-acid battery pack by taking the DC power from the battery pack, converting it to AC power and directing the AC current to the home or facility.

Figure 1:
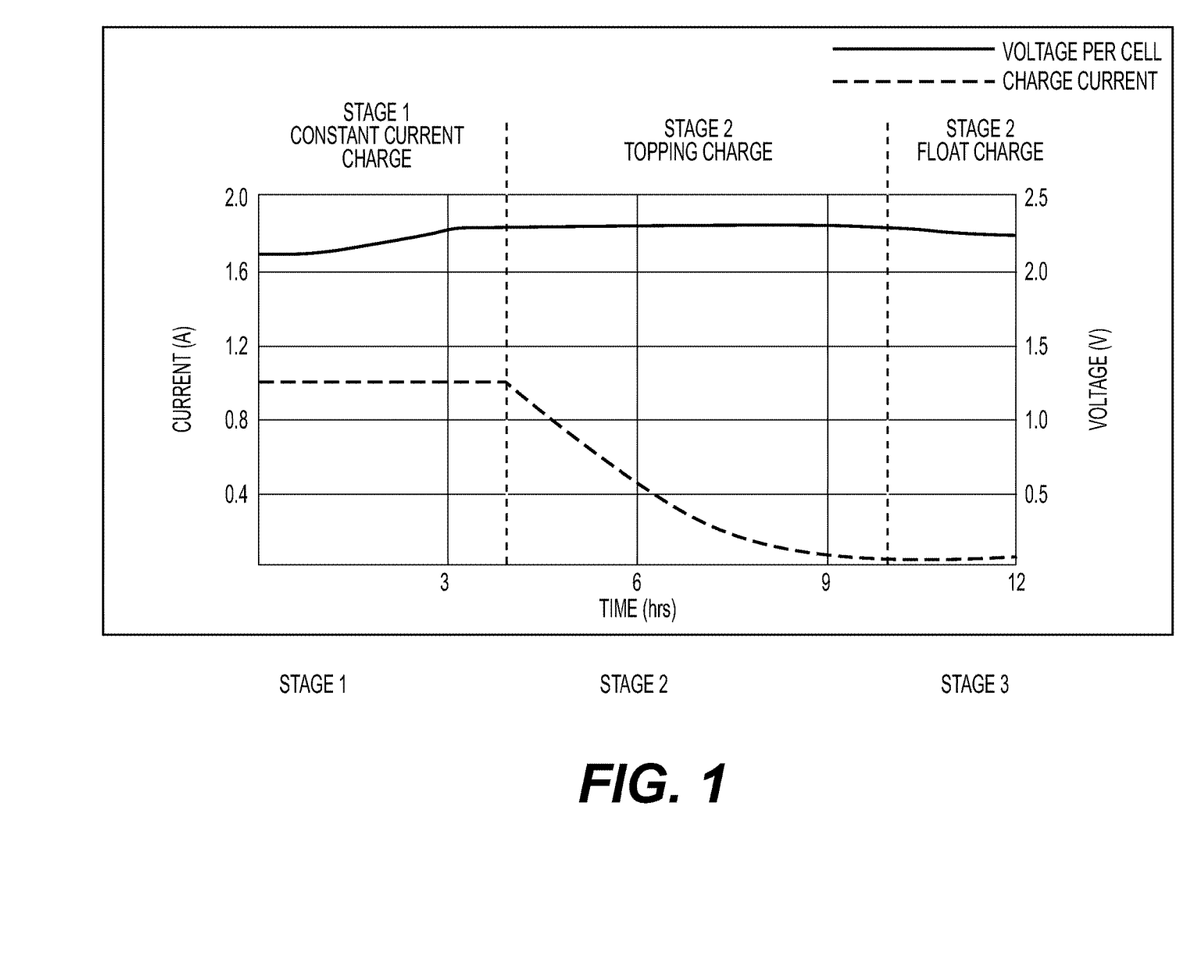
FIG. 1 is a graph illustrating an algorithm for charging lead-acid batteries.

Standard inverter/chargers for lead-acid batteries use a simple algorithm to recharge the batteries. As shown in FIG. 1, lead acid batteries are typically charged in three stages: 1) a constant-current charge; 2) a constant voltage charge or topping charge; and 3) a float charge. The constant-current charge applies the bulk of the charge and takes up roughly half of the required charge time; the topping charge continues at a lower charge current to maintain the voltage of the battery and provides saturation, and the float charge compensates for the loss caused by self-discharge. The switch from Stage 1 to 2 occurs seamlessly and happens when the battery reaches the set voltage limit. The current begins to drop as the battery starts to saturate, and full charge is reached when the current decreases to the three percent level of the rated current.

Lithium Metal Polymer (LMP) batteries and to a lesser extent, lithium-ion batteries, require a more complex algorithm for recharging than lead-acid batteries due to their specific chemistry and to the need of monitoring and controlling their temperature during charge, discharge and floating and the specific need to monitor the voltage of each individual cells of the batteries. For these reasons, it is not possible to simply replace a lead-acid battery pack with a lithium battery pack in an existing Uninterruptible power supply (UPS) system for homes and facilities. The entire system including the inverter/charger must be replaced.

Lithium batteries have higher energy density that lead-acid batteries, require less maintenance and last longer than lead-acid batteries and are therefore ideally suited for Uninterruptible power supply (UPS) system for homes and facilities. However, the initial cost of replacing the entire UPS system instead of just the battery pack has refrained home and business owners from switching to Lithium batteries even if it represents saving in the mid to long term range (3-5 years).

Thus, there is a need for a circuit device adapted for linking a lithium based battery pack to a standard inverter/charger for lead-acid batteries and therefore allow the replacement of a lead-acid battery pack with a lithium based battery pack.

SUMMARY OF THE INVENTION

It is an object of the present invention to ameliorate at least some of the inconveniences present in the prior art.

It is also an object of the present invention to provide a conversion circuit device connecting at least one lithium based battery to a standard inverter/charger for lead-acid batteries, the conversion circuit device translating the state of the at least one lithium based battery into signals that correspond to the state of a lead-acid battery pack in order to charge or discharge the at least one lithium based battery using the standard inverter/charger for lead-acid batteries.

In one aspect, the invention provides a conversion circuit device including a DC-DC converter adapted to transform and convert a charge current of the inverter/charger from one voltage level to another voltage level or into a higher or lower constant charge current.

In a further aspect, the conversion circuit device is connected to an ECU of the at least one lithium based battery which relays various states of the at least one lithium based battery to the conversion circuit device and the conversion circuit device translates electrically the various states of the at least one lithium based battery into voltage readings to the inverter/charger.

In another aspect, the conversion circuit device is integrated into an electronic control unit (ECU) of a lithium based battery.

It is also an object of the present invention to provide an Uninterruptible Power Supply (UPS) systems for homes and facilities comprising a standard inverter/charger for lead-acid batteries, at least one lithium based battery, and a conversion circuit device connecting the at least one lithium based battery to the standard inverter/charger; the conversion circuit device translating the state of the at least one lithium based battery into electrical signal levels that correspond to the state of a lead-acid battery.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 2:
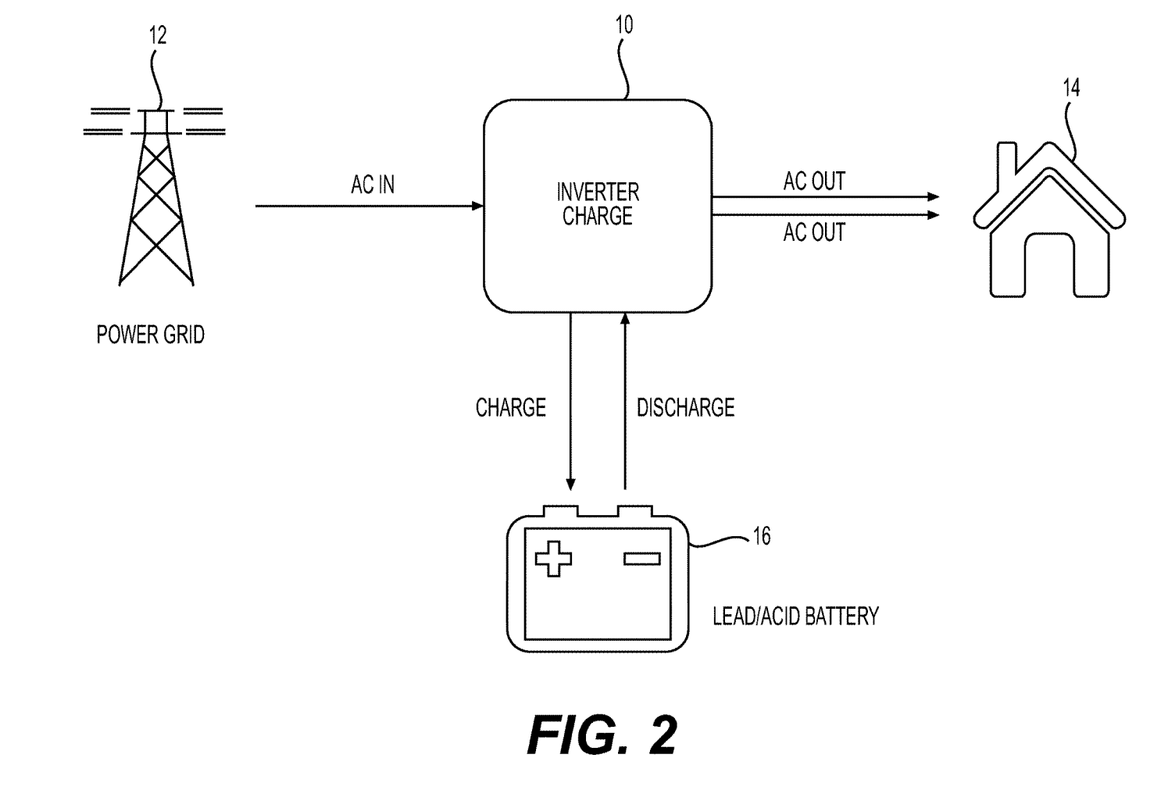
FIG. 2 is a diagram illustrating a standard Uninterruptible power supply (UPS) system for homes including lead-acid batteries.

With reference to FIG. 2, there is shown a diagram illustrating a standard Uninterruptible Power Supply (UPS) system for homes. The standard UPS includes an Inverter/charger 10 connected into the electrical power supply of the home 14 between the power grid 12 and the electrical inlet of the home 14. The inverter/charger 10 is also connected to a standard 48 Vdc lead-acid battery pack 16 When not in operation, the inverter/charger 10 is transparent and lets AC current from the power grid 12 flow directly into the electrical inlet of the home 14. The primary functions of the UPS is to inject electrical power from the lead-acid battery pack 16 to the home 14 when power consumption of the home 14 exceeds the capacity of the power grid 12 or for peak shaving to ensure that power consumption of the home 14 does not exceed a threshold where the electricity becomes more expensive; and to supply back-up electrical power to the home 14 exclusively from the battery pack 16 when the power grid 12 is down.

In particular, the Inverter/charger 10 converts AC current from the power grid 12 into DC current to charge or recharge the lead-acid battery pack 16 and converts DC current from the lead-acid battery pack 16 into AC current to supply the home 14. The Inverter/charger 10 also monitors the state of charge of the lead-acid battery pack 16 and recharges the battery pack 16 when required and/or when power consumption of the home 14 is low and electricity from the power grid 12 is inexpensive such as in the middle of the night for example. The Inverter/charger 10 also monitors the power consumption of the home 14 and supplements the AC current from the power grid 12 with additional AC current converted from the lead-acid battery pack 16 when power consumption exceeds a predetermined threshold for peak shaving purposes and of course, monitors the power supply from the power grid 12 and supplies back-up electrical power to the home 14 exclusively from the lead-acid battery pack 16 when the power grid 12 is down.

The Inverter/charger 10 is designed specifically for lead-acid batteries and as such only monitors the voltage V of the lead-acid battery pack 16 and responds to a low voltage V of the battery pack 16 by injecting DC current into the battery pack 16 either with constant current charge or constant voltage charge according to the algorithm previously described with reference to FIG. 1. In charging mode, the Inverter/charger 10 applies a constant current until the battery pack 16 reaches the pre-set voltage threshold and then switches to a constant voltage charge to complete the recharge of the lead-acid battery pack 16.

As previously described, Lithium Metal Polymer (LMP) batteries and lithium-ion batteries require a more complex algorithm for recharging than lead-acid batteries due to their specific chemistry and to the need of monitoring and controlling their temperature during charge, discharge and floating and the need to monitor each voltage level of individual electrochemical cell of the batteries. A lithium battery includes a plurality of electrochemical cells and the voltage of each electrochemical cell must be monitored individually to ensure that none of the cells fall into an overdischarge condition that could permanently damage the cell or cells and affect the performance of the battery. A lithium battery therefore includes an Electronic Control Unit (ECU) that monitors various parameters of the battery and specifically the voltage of each electrochemical cell of the battery, the temperature of the battery and controls the balancing of the electrochemical cell of the battery.

Figure 3:
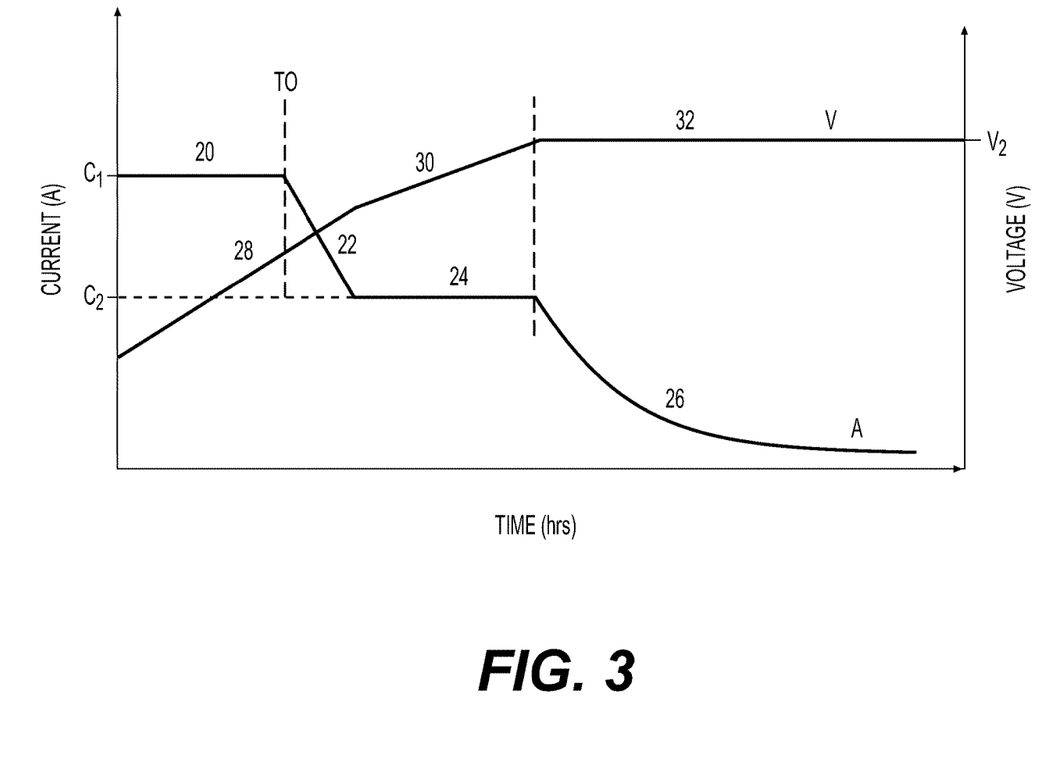
FIG. 3 is a graph illustrating an algorithm for charging Lithium batteries.

Initially, lithium metal polymer (LMP) batteries must be heated before the charge current can be applied to the electrochemical cells of the battery. With reference to FIG. 3 which illustrates the charging algorithm of an LMP battery, the initial heating phase is carried out at constant current $C_1$ as indicated by portion 20 of the charge current curve A; the constant current $C_1$ being directed to the heating system of the lithium battery. The rise in temperature of the electrochemical cells of the battery causes an increase in the voltage V of the battery as indicated by section 28 of the voltage curve V. The temperature of the battery is monitored by the Electronic Control Unit (ECU) of the battery. Once the operational temperature $T_o$ has been reached, the constant current charge is deviated from the heating system to the electrochemical cells of the lithium battery and proper charging of the individual cells of the battery begins.

The charging current $C_1$ is gradually reduced to a lower current set point $C_2$ as indicated by section 22 of the charge current curve A and the ECU cuts off the heating to prevent a further increase in the temperature T of the lithium battery and therefore avoid overheating. Once the charge current has reached the current set point $C_2$, the current charge returns to a constant current $C_2$ as indicated by section 24 of the charge current curve A and the voltage V of the battery increases at a constant rate which is marginally inferior to the previous voltage increase 28 as indicated by section 30 of the voltage curve V. The constant current $C_2$ is applied to the battery until the voltage of the battery reaches a predetermined value $V_2$ indicative of a fully charge state. At this point, the charge current is changed to a constant voltage charge or topping charge and the current gradually decreases as indicated by section 26 of the charge current curve A to maintain the voltage of the battery. During this phase 32 of the battery voltage, the ECU balances the individual cells of the battery and deviates the charge current from the electrochemical cells that have reached their maximum voltage until all electrochemical cells are fully charges thereby providing saturation.

In order to replace a lead-acid battery pack with a lithium battery pack in an existing Uninterruptible power supply (UPS) system for homes and facilities including an Inverter/charger 10 specifically designed for lead-acid batteries without having to replace the entire system, there has to be a device linking the lithium battery pack to the Inverter/charger 10 that fools to the Inverter/charger 10 into thinking that the lithium battery pack is a lead-acid battery pack by simulating the behavior of a lead-acid battery towards the Inverter/charger 10 by translating the particular states and requirements of the lithium battery pack into voltage levels corresponding to values of a lead-acid battery pack.

Figure 4:
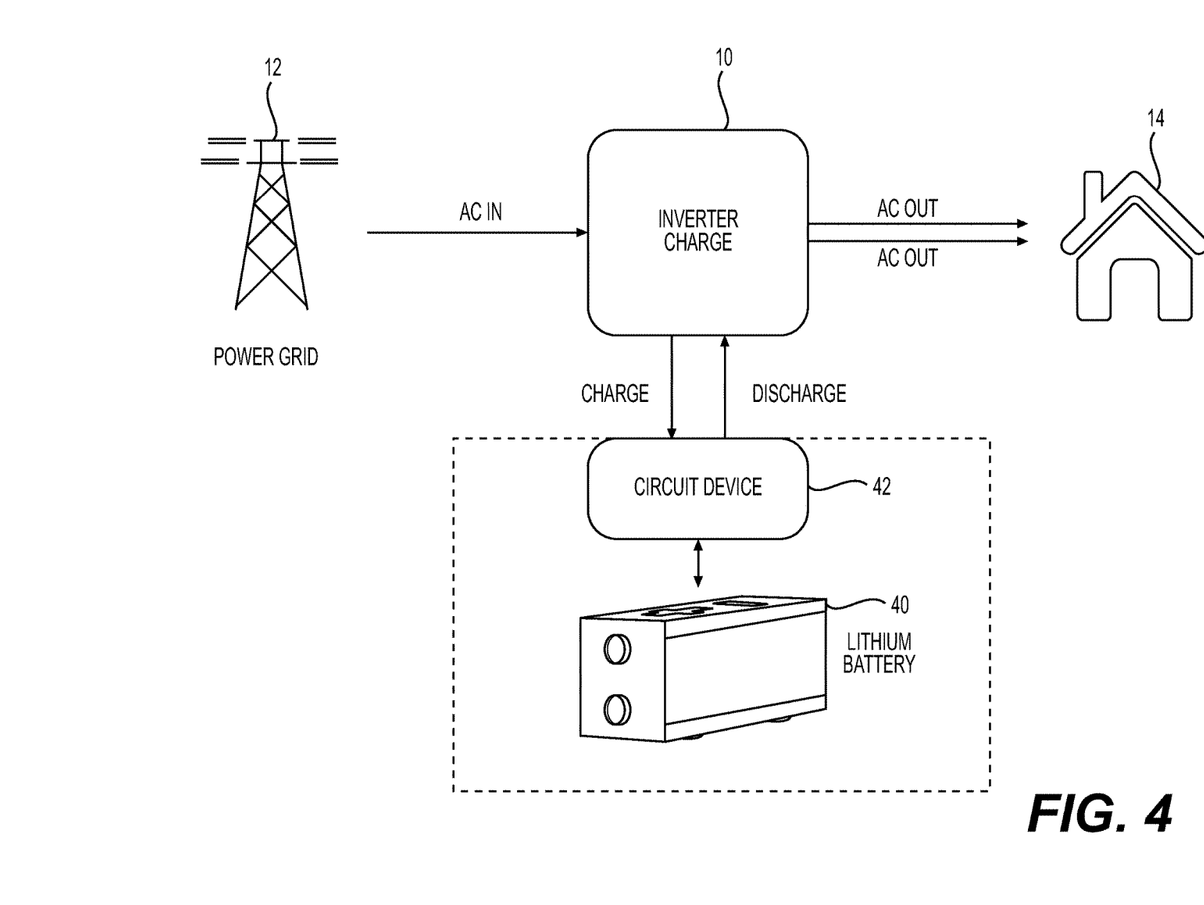
FIG. 4 is a diagram illustrating a standard Uninterruptible power supply (UPS) system for homes including lithium batteries and a circuit device in accordance with one embodiment of the invention.

With reference to FIG. 4, there is shown a diagram illustrating a standard Uninterruptible power supply (UPS) system for homes including the same Inverter/charger 10 connected into the electrical power supply of the home 14 between the power grid 12 and the electrical inlet of the home 14. However the inverter/charger 10 is connected to a lithium battery pack 40 via a conversion circuit device 42 designed to translate the state of the lithium battery pack 40 into signals that correspond to the state of a lead-acid battery pack and therefore limited to a voltage signal. The conversion circuit device 42 is connected to the ECU of the batteries which relay the specific state of the lithium batteries (voltage of each electrochemical cell, temperatures, etc.) and the conversion circuit device 42 translates the various states of the lithium batteries into voltage readings to which the inverter/charger 10 is programmed to understand and respond to. In effect, the conversion circuit device 42 manages the charging current and voltage from the inverter/charger 10 to the lithium battery pack 40 to recharge the lithium battery pack 40 following the charging algorithm described with reference to FIG. 3.

The conversion circuit device 42 includes a DC-DC converter adapted to transform or convert the charge current of the inverter/charger 10 from one voltage level to another voltage level. In the present application, the voltage level of the inverter/charger 10 is fixed at 48 Vdc. Thus the DC-DC converter of the conversion circuit device 42 can convert the 48 Vdc input voltage of the inverter/charger 10 into a higher or lower output voltage as required. For instance, the lithium battery pack 40 may have a maximum voltage of 72 Vdc when fully charge. The DC-DC converter of the conversion circuit device 42 is able to convert the 48 Vdc input voltage of the inverter/charger 10 into a 72 Vdc output voltage when constant voltage charge is required at the end of the charge cycle. Therefore, the conversion circuit device 42 may be combined with different types of batteries or battery packs having higher or lower maximum voltages.

The DC-DC converter of the conversion circuit device 42 is also adapted to convert the input DC charge current from the inverter/charger 10 from one DC current level to another DC current level as required by the charging algorithm.

Figure 5:
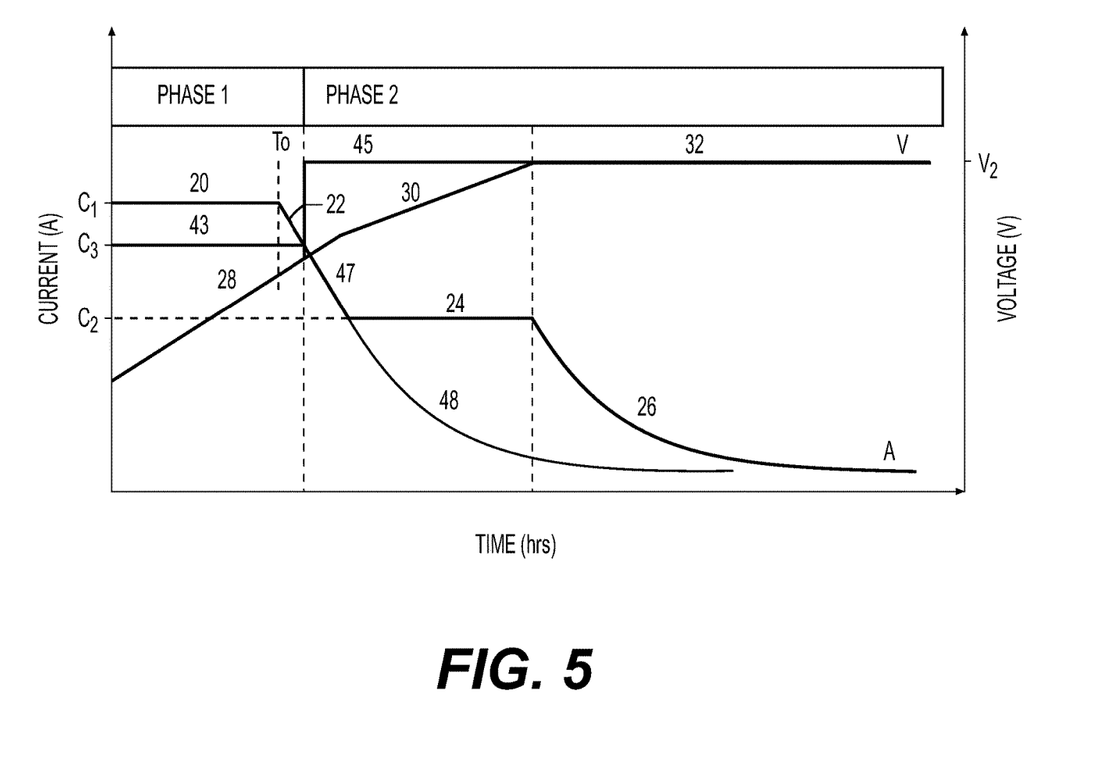
FIG. 5 is a graph illustrating an algorithm for charging Lithium batteries with the inverter/charger 10 programmed specifically for lead-acid batteries using the circuit device shown in FIG. 4.

FIG. 5 is a graph illustrating how the conversion circuit device 42 controls and monitors the charging of the lithium battery pack 40 with the inverter/charger 10 programmed specifically for lead-acid batteries. In the initial Phase 1 which corresponds to stage 1 of FIG. 1, the conversion circuit device 42 sends to the inverter/charger 10 the real voltage reading of the lithium battery pack 40 in the discharge state which corresponds to section 28 of the voltage curve V. The inverter/charger 10 responds by applying a constant current charge $C_3$ corresponding to the constant current charge required by the lead-acid battery pack 16 of FIG. 2 which is below the constant current $C_1$ required by the lithium battery pack 40. The DC-DC converter of the conversion circuit device 42 transforms the constant current $C_3$ into a higher constant current $C_1$ which is applied to the heaters of the lithium batteries in order to raise their temperature to their operational temperature $T_o$. In this phase 1, the rise in temperature of the electrochemical cells of the lithium battery causes an increase in the voltage V of the battery as indicated by section 28 of the voltage curve V. Once the operational temperature $T_o$ has been reached, the constant current charge is deviated from the heating system to the electrochemical cells of the lithium battery and proper charging of the individual cells of the battery begins. At this point, the DC-DC converter of the conversion circuit device 42 gradually reduces the charging current $C_1$ to a lower current set point $C_2$ as indicated by section 22 of the charge current curve A to prevent a further increase in the temperature T of the lithium battery and therefore avoid overheating as previously described. In Phase 1, the voltage of the lithium battery pack 40 increases at a constant rate as indicated by section 28 of the voltage curve V.

When the charge current A reaches the value $C_3$ as indicated by the intersection of section 22 with line 43 corresponding to the value $C_3$, the conversion circuit device 42 exhibits a voltage level $V_2$ read by the inverter/charger 10 as indicative that the lithium battery pack 40 is fully charged even though the lithium battery pack 40 is not fully charged but is still charging. The inverter/charger 10 responds by switching to a constant voltage charge as indicated by section 45 of the voltage curve V in order to pass into Phase 2 which corresponds to the switch to a constant voltage charge (stage 2 of FIG. 1) in which the current charge A is gradually reduced. In doing so the charging current follows the gradual reduction of current of section 22 of FIG. 3 as indicated by section 47 of the charge current curve A in FIG. 5.

Once the current charge reaches the value $C_2$ corresponding to the lower current set point, the conversion circuit device 42 transform the constant voltage charge into a constant current charge $C_2$ through its DC-DC converter and the charge current is modified to correspond to section 24 of FIG. 3 instead of following the gradual decline indicated by section 48 which corresponds to stage 2 of FIG. 1. With the return to a constant current $C_2$ as indicated by section 24 of the charge current curve A, the voltage of the lithium battery pack 40 continues to increase but at a constant rate as indicated by section 30 of the voltage curve V which is slightly inferior to the previous voltage increase indicated by section 28.

The constant current $C_2$ is applied to the lithium battery pack 40 until the voltage of the lithium battery pack 40 reaches a predetermined value $V_2$ indicative of a fully charge state which may be as high as 72 Vdc. At this point, the conversion circuit device 42 reverts back to a constant voltage charge or topping charge, the DC-DC converter transform the 48 Vdc input voltage into a $V_2$ constant voltage charge current and the current gradually decreases as indicated by section 26 of the charge current curve A to maintain the voltage of the lithium battery pack 40 at $V_2$ as indicated by section 32 of the voltage curve. During this phase 32 of the battery voltage, the ECU balances the individual cells of the battery and the charge current is deviated from the electrochemical cells that have reached their maximum voltage until all electrochemical cells are fully charged thereby providing saturation.

The conversion circuit device 42 therefore acts as an intermediary between the lithium battery pack 40 and the Inverter/charger 10 and enables the recharge of the lithium battery pack 40 in accordance with its specific charging algorithm even though the Inverter/charger 10 is programmed to follow the simple charging algorithm of a lead-acid battery.

As previously described, the conversion circuit device 42 may be used with any types of batteries with varying voltages. The conversion circuit device 42 may also be used with batteries having different charging algorithms. In this case, the conversion circuit device 42 is programmed to translate the state of the specific battery into signals that correspond to the state of a lead-acid battery in order to function with the Inverter/charger 10.

In discharge mode as when the power grid 12 is down or for peak shaving purposes to ensure that power consumption of the home 14 does not exceed a threshold where electricity from the power grid 12 is more expensive, the conversion circuit device 42 includes a parallel circuit that allow DC current flowing from the lithium battery pack 40 to bypass the conversion circuit device 42 and go directly to the Inverter/charger 10 thereby preventing overheating of the conversion circuit device 42 when the discharge current from the lithium battery pack 40 is high.

In discharge mode, the ECU of the lithium battery pack 40 monitors the voltages of each individual electrochemical cell of the battery or batteries as well as the temperature of the batteries. In the event that a single of the plurality of electrochemical cells of a battery reaches its minimum voltage threshold before the battery is fully discharged, the ECU relays the information to the conversion circuit device 42 which in turn simulates that the whole lithium battery pack 40 is fully discharged and the Inverter/charger 10 responds by shutting off the discharge current from the battery pack 40 thereby preventing damage to the battery via one of its electrochemical cells falling into an overdischarged state.

Also in the discharge mode, the ECU of the lithium battery pack 40 monitors the temperature of the batteries and if the temperature of the batteries exceeds a maximum threshold or falls below a minimum threshold, the ECU relays the information to the conversion circuit device 42 which in turn simulates that the lithium battery pack 40 is fully discharged and the Inverter/charger 10 responds by shutting off the discharge current from the battery pack 40 to prevent damage to the battery due to temperatures out of range.

The conversion circuit device 42 is shown and described as separated from the lithium battery pack 40 however the conversion circuit device 42 could be integrated into the electronic control units (ECU) of the lithium batteries of the battery pack 40 without difficulties.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A conversion circuit device connecting at least one lithium based battery to a standard inverter/charger for lead-acid batteries, the conversion circuit device translating the state of the at least one lithium based battery into signals that correspond to the state of a lead-acid battery pack in order to charge or discharge the at least one lithium based battery using the standard inverter/charger for lead-acid batteries.

2. A conversion circuit device as defined in claim 1 wherein the signals received by the inverter/charger are voltage levels.

3. A conversion circuit device as defined in claim 2 wherein the conversion circuit device includes a DC-DC converter adapted to transform and convert a charge current of the inverter/charger from one voltage level to another voltage level.

4. A conversion circuit device as defined in claim 3 wherein the DC-DC converter of the conversion circuit device transforms a constant charge current from the inverter/charger into a higher or lower constant charge current.

5. A conversion circuit device as defined in claim 1 wherein the conversion circuit device is connected to an ECU of the at least one lithium based battery which relays various states of the at least one lithium based battery to the conversion circuit device and the conversion circuit device translates the various states of the at least one lithium based battery into voltage readings to the inverter/charger.

6. A conversion circuit device as defined in claim 5 wherein the various states of the at least one lithium based battery include voltage level of each individual electrochemical cell of the at least one lithium based battery and temperature of the at least one lithium based battery.

7. A conversion circuit device as defined in claim 6 wherein, in a discharge mode, in the event that a single electrochemical cell of the at least one lithium based battery reaches its minimum voltage threshold before the at least one lithium based battery is fully discharged, the ECU relays the voltage level of the individual electrochemical cell to the conversion circuit device which in turn simulates to the Inverter/charger that the at least one lithium based battery is fully discharged thereby shutting off the discharge current from the at least one lithium based battery.

8. A conversion circuit device as defined in claim 6 wherein, in a discharge mode, in the event that the temperature of the at least one lithium based battery exceeds a maximum threshold or falls below a minimum threshold, the ECU relays the temperature reading to the conversion circuit device which in turn simulates to the Inverter/charger that the at least one lithium based battery is fully discharged thereby shutting off the discharge current from the at least one lithium based battery.

9. A conversion circuit device as defined in claim 1 further comprising a bypass parallel circuit wherein in a discharge mode, DC current flowing from the at least one lithium based battery bypasses the conversion circuit device and flows directly to the Inverter/charger to prevent overheating of the conversion circuit device.

10. A conversion circuit device as defined in claim 1 wherein the conversion circuit device is integrated into an electronic control unit (ECU) of the at least one lithium based battery.

11. An Uninterruptible Power Supply (UPS) system for homes and facilities comprising a standard inverter/charger for lead-acid batteries, at least one lithium based battery, and a conversion circuit device connecting the at least one lithium based battery to the standard inverter/charger; the conversion circuit device translating the state of the at least one lithium based battery into signals that correspond to the state of a lead-acid battery.

12. An Uninterruptible Power Supply (UPS) system as defined in claim 11 wherein the conversion circuit device includes a DC-DC converter adapted to transform and convert a charge current of the inverter/charger from one voltage level to another voltage level.

* * * * *